United States Patent [19]

Bernet et al.

[11] Patent Number: 5,392,312
[45] Date of Patent: Feb. 21, 1995

[54] METHOD AND DEVICE FOR REGULATING THE COMBUSTION AIR FLOW RATE OF A FLUE RATE GAS COLLECTION DEVICE OF A METALLURGICAL REACTOR, CORRESPONDING COLLECTION DEVICE AND METALLURGICAL REACTOR

[75] Inventors: Thierry Bernet; Hervé Dusser; Sylvain Fiorelli; Daniel Pernet, all of Metz, France

[73] Assignee: Unimetal Societe Francaise des Aciers Longs, Metz Cedex, France

[21] Appl. No.: 26,751

[22] Filed: Mar. 5, 1993

[30] Foreign Application Priority Data

Mar. 16, 1992 [FR] France .................. 92 03108

[51] Int. Cl.$^6$ .................................. F27D 7/00
[52] U.S. Cl. ........................... 373/9; 373/2; 266/44
[58] Field of Search .................... 373/2, 8, 9, 77, 79, 373/80, 68; 123/694; 374/37; 126/116 A; 266/44

[56] References Cited

U.S. PATENT DOCUMENTS

| | | | |
|---|---|---|---|
| 3,453,369 | 7/1969 | Dock | 373/9 |
| 4,242,532 | 12/1980 | Squibbs | 373/8 |
| 4,382,698 | 5/1983 | Szonntagh | 374/37 |
| 4,450,569 | 5/1984 | Hagendoorn | 373/9 |
| 4,559,629 | 12/1985 | Fedele Dell'Oste | 373/80 |
| 4,646,315 | 2/1987 | Hixenbaugh et al. | 373/2 |
| 4,655,436 | 4/1987 | Williams | 266/44 |
| 4,953,177 | 8/1990 | Tommaney et al. | 373/68 |
| 5,199,409 | 4/1993 | Miyashita et al. | 123/694 |

FOREIGN PATENT DOCUMENTS

| | | |
|---|---|---|
| 0026118 | 4/1981 | European Pat. Off. . |
| 1433994 | 2/1966 | France . |
| 1532756 | 6/1968 | France . |

*Primary Examiner*—Bruce A. Reynolds
*Assistant Examiner*—Tu Hoang
*Attorney, Agent, or Firm*—Oblon, Spivak, McClelland, Maier, & Neustadt

[57] ABSTRACT

In order to regulate the combustion air flow rate of a flue gas collection device (1) of a metallurgical reactor (2) comprising a combustion chamber (4) supplied with air by a variable flow fan (9), a set value $C_0$ for the oxygen content in the flue gases in the discharge duct (5) is set, the oxygen content $M_1$ of the flue gases at the outlet of the combustion chamber (4) is measured, using $C_0$ and $M_1$, a setting $C_1$ for varying the combustion air flow rate is calculated, a variable representative of the sudden variations of the flow rate of unburnt gases at the outlet of the metallurgical reactor (2) is measured and a setting $C_2$ for the combustion air flow rate is calculated to achieve complete combustion of the unburnt gases in the flue gases; the values $C_1$ and $C_2$ are added to obtain a setting for the combustion air flow rate which is sent to the regulation device of the fan (9); these calculations may be carried out by electronic means (14, 15, 16).

8 Claims, 3 Drawing Sheets

METHOD AND DEVICE FOR REGULATING THE COMBUSTION AIR FLOW RATE OF A FLUE RATE GAS COLLECTION DEVICE OF A METALLURGICAL REACTOR, CORRESPONDING COLLECTION DEVICE AND METALLURGICAL REACTOR

FIELD OF THE INVENTION

The invention relates to the regulation of the combustion air flow rate of the combustion chamber of a device for discharging the flue gases of a metallurgical reactor, in particular of an electric arc furnace.

Metallurgical reactors, and in particular electric arc furnaces intended for manufacturing steel by melting scrap iron, are equipped with a flue gas discharge device comprising, in sequence, a collection duct, a combustion chamber, a discharge duct which opens into a dedusting installation and a flue. The function of the combustion chamber is to complete the combustion of the gases contained in the flue gases originating from the furnace. Indeed, the latter contain incompletely burnt gases, for example carbon monoxide which must be completely burnt in order to transform them into inert gas so as to avoid any risk of sudden combustion or explosion in the downstream part of the flue gas discharge circuit.

The combustion chamber is fed with combustion air by a fan the flow rate of which is regulated from a measurement of the oxygen content taken at the outlet of the combustion chamber. It is specified that this oxygen content must be greater than a minimum value in order to guarantee complete combustion of the gases.

In leaktight electric furnaces, this method has a disadvantage as there may be a rapid production of bursts of carbon monoxide and, since the regulation is effected by measurement after the combustion chamber, it is not rapid enough to ensure complete combustion of the gases produced.

By "leaktight" furnace is meant the usual electrical furnaces which have been arranged in order to improve their leaktightness with respect to the ambient atmosphere at the level of the slag-off door, of the roof joint and of the orifices for passage of the electrodes.

SUMMARY OF THE INVENTION

The object of the invention is to overcome this disadvantage by proposing a method for regulating the combustion air of the combustion chamber of a device for discharging the flue gases of a metallurgical reactor which reacts rapidly to transient regimes.

To this end, the subject of the invention is a method for regulating the combustion air flow rate of the combustion chamber of a flue gas collection device of a metallurgical reactor, in particular of an electric arc furnace, of the type comprising a collection duct, a combustion chamber, a variable flow rate combustion air supply fitted with a flow rate regulation device and a discharge duct, wherein:

a set value $C_0$ for the oxygen content in the flue gases in the discharge duct at the outlet of the combustion chamber is set, the oxygen content $M_1$ in the flue gases at the outlet of the combustion chamber in the duct is measured, using the measurement $M_1$ and the setting $C_0$, a setting $C_1$ for varying the combustion air flow rate is calculated, which setting tends to adjust the combustion air flow rate so that the oxygen content of the flue gases at the outlet of the combustion chamber is equal to $C_0$, moreover, at least one variable which makes it possible to detect a sudden variation of the flow rate of unburnt gases at the outlet of the metallurgical reactor is measured, and a setting $C_2$ for the combustion air flow rate necessary in order to achieve at least complete combustion of the unburnt gases contained in the flue gases is calculated, the settings $C_1$ and $C_2$ are added in order to obtain a setting $C_3$ which is sent to the regulation device of the combustion air supply device.

In a first embodiment, the variable making it possible to detect a sudden variation of the flow rate of unburnt gases at the outlet of the metallurgical reactor is the pressure difference $M_5$ prevailing between the inside and the outside of the metallurgical reactor, the setting $C_2$ is then determined by calculating the derivative with respect to time of the difference $M_5$, if this derivative is less than a critical threshold $s_c$, the setting $C_2$ is zero, if the derivative $M_5$ is greater than the critical threshold $s_c$, the setting $C_2$ is equal to $k \times M_5$; $s_c$ and $k$ have values determined experimentally for each reactor.

In a second embodiment, the variable which makes it possible to detect a sudden variation of the flow rate of unburnt gases at the outlet of the metallurgical reactor is the content $M_2$ expressed in % of incompletely burnt gases in the flue gases at the outlet of the metallurgical reactor in the collection duct and for determining the setting $C_2$, thresholds $s_1, s_2, \ldots, s_n$, stepped between 0% and 100% and pulses of amplitude $a_1, a_2, \ldots, a_n$ and of duration $t_1, t_2, \ldots, t_n$, are used, when the measurement $M_2$ lies between $s_i$ and $s_{i+1}$, a pulse of amplitude $a_i$ and of duration $t_i$ is emitted and the pulses thus emitted are added.

In a third embodiment, in order to determine the setting $C_2$ for the combustion air flow rate, the content $M_2$ of incompletely burnt gas in the flue gases at the outlet of the metallurgical reactor in the collection duct is measured, the combustion air flow rate $M_3$ at the outlet of the combustion air feeding device is measured, the flue gas flow rate $M_4$ in the discharge duct at the outlet of the combustion chamber is measured, using the measurements $M_1$, $M_2$, $M_3$, $M_4$ and the setting $C_0$, the setting $C_2$ for the combustion air flow rate corresponding to the air flow rate necessary to achieve complete combustion of the unburnt gases contained in the flue gases and to have at the outlet of the combustion chamber an oxygen content in the flue gases equal to $C_0$ is calculated.

In this case, in order to calculate the setting $C_2$, the flow rate of flue gases at the outlet of the furnace is calculated either by the approximate formula:

$$q_f = \left(1 - \frac{C_0}{100}\right) \times M_4 - 0.8 \times M_3$$

or by the more accurate formula:

$$q_f = \left(1 - \frac{M_1}{100}\right) \times M_4 - 0.8 \times M_3$$

then the oxygen flow rate necessary is calculated $$q_{O2} = \alpha q_f \times \frac{M_2}{100} + \frac{C_0}{100} M_4$$

where $\alpha$ is a stoichiometric coefficient equal to 0.5 when the unburnt gas is carbon monoxide, and the setting $C_2$ for the combustion air flow rate is calculated $$C_2 = q_{O2} \times \frac{1}{0.2}.$$

The subject of the invention is also a device for regulating the flow rate of the combustion air supply of the combustion chamber of a flue gas discharge assembly of a metallurgical reactor, in particular of an electric arc furnace comprising a flue gas collection duct connected to the metallurgical reactor, a combustion chamber receiving the flue gases coming from the collection duct and supplied with combustion air by a supply member such as a fan fitted with a flow rate regulation device capable of receiving an outside setting, a flue gas discharge duct mounted in series on the combustion chamber, which comprises:

a means for measuring the oxygen content in the flue gases in the discharge duct at the outlet of the combustion chamber, a means for measuring the content of incompletely burnt gas at the outlet of the metallurgical reactor before entering the combustion chamber, an electronic calculation and regulation means connected to the means for measuring the oxygen content and for measuring the content of unburnt gases, and to the flow rate regulation device of the combustion air supply device.

Preferably, the device comprises moreover:

a means for measuring the flow rate of the flue gases in the discharge duct at the outlet of the combustion chamber, a means for measuring the flow rate of combustion air at the outlet of the combustion air supply device, said means being connected to the electronic calculation and regulation means.

In a particular embodiment, the electronic calculation and regulation means comprises a PID regulator, an electronic calculator and a summing integrator.

The means for measuring the flow rate of the flue gases or of the combustion air may consist of Pitot tubes.

When the unburnt gas contained in the flue gases is carbon monoxide, the means for measuring the content of unburnt gases is for instance an infrared radiation absorption detector.

The invention also relates to a device for regulating the flow rate of the combustion air supply of the combustion chamber of a flue gas discharge assembly of a metallurgical reactor, in particular of a leaktight electric arc furnace comprising a flue gas collection duct connected to the metallurgical reactor, a combustion chamber receiving the flue gases coming from the collection duct and supplied with combustion air by a supply member such as a fan fitted with a flow rate regulation device capable of receiving an outside setting, a flue gas discharge duct mounted in series with the combustion chamber, which comprises:

a means for measuring the oxygen content in the flue gases in the discharge duct at the outlet of the combustion chamber, a means for measuring the pressure difference between the outside and the inside of the enclosure of the metallurgical reactor, an electronic calculation and regulation means connected to the means for measuring the oxygen content and the pressure difference and also connected to the flow rate regulation device of the combustion air supply device.

Preferably, the means for measuring the oxygen content is a zirconia cell.

The invention also relates to a device for collecting the flue gases of a metallurgical reactor of the type comprising a collection duct, a combustion chamber fitted with a combustion air supply member and a flue gas discharge duct which is fitted with a device for regulating the flow rate of the combustion air supply member according to the invention.

It also relates to a metallurgical reactor equipped with such a device; this metallurgical reactor may be an electric furnace.

BRIEF DESCRIPTION OF THE DRAWINGS

The invention will now be described in greater detail with reference to the appended figures in which.

DETAILED DESCRIPTION OF THE PREFERRED EMBODIMENTS

Figure 1:
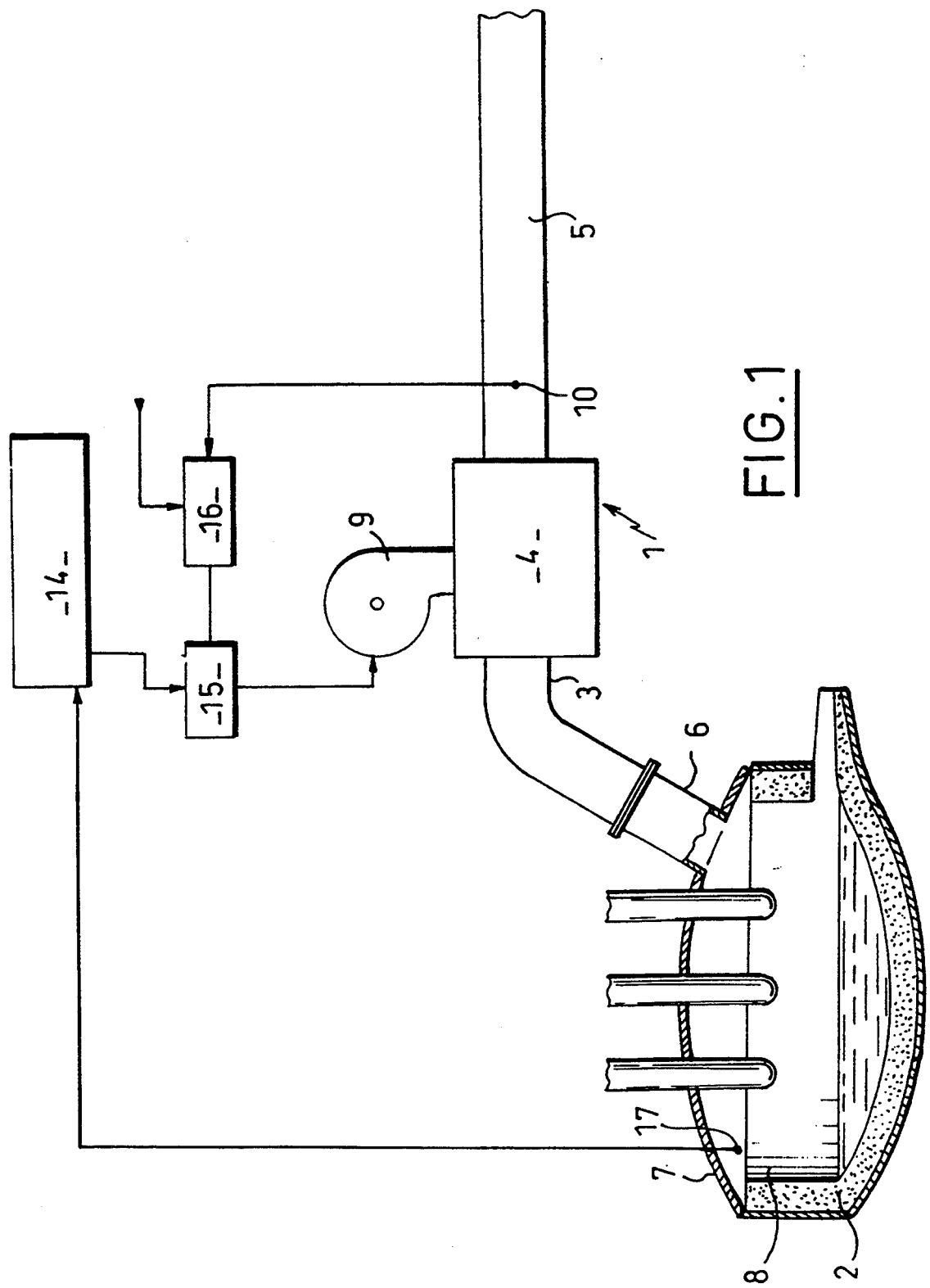
FIG. 1 represents a diagram of a device for collecting the gases and flue gases of an electric furnace fitted with a regulation device according to a first embodiment of the invention.

The assembly for collecting the gases and flue gases of an arc furnace 2, generally referred to by 1, comprises a collection duct 3, a combustion chamber 4 and a flue gas discharge duct 5. The collection duct 3, the combustion chamber 4 and the discharge duct 5 are mounted in series. The free end of the collection duct 3 is opposite a pipe 6 placed on the roof 7 of the furnace 2 which connects the inside 8 of the furnace 2 with the duct 3. The discharge duct 5 is connected to a flue gas purification device supplemented by a flue (not shown). The combustion chamber 4 is supplied with combustion air by a fan 9. The fan 9 is fitted with a flow rate regulation capable of receiving a flow rate setting originating outside.

During steelmaking in the furnace 2, flue gases containing, in particular, carbon monoxide are produced in the enclosure 8 of the furnace. These flue gases pass through the pipe 6, then through the collection duct 3 and arrive in the combustion chamber where they are mixed with air supplied by the fan 9. In the combustion chamber 4, the carbon monoxide burns and converts into carbon dioxide which is an inert gas. The flue gases are then discharged by means of the discharge duct 5.

It is important that the combustion of the carbon monoxide should be complete in order to avoid any risk of combustion or explosion downstream of the combustion chamber.

To ensure that this combustion is complete, it is specified that the oxygen content of the flue gases in the discharge duct 5, at the outlet of the combustion chamber, should be greater than a set value $C_0$ fixed for example at 10% and the combustion air flow rate of the combustion chamber is regulated so that this condition is achieved, but without-an excessively high combustion air flow rate, so as not to choke up the flue gas discharge device located downstream of the combustion chamber.

This regulation of the combustion air flow rate is necessary because the flue gas flow rate and the carbon monoxide content of the latter are not constant throughout a steelmaking operation. In particular, when the crap iron charge collapses into the liquide steel bath or during the decarburation phase, there is a sudden and considerable increase in the quantity of flue gases produced and in the carbon monoxide content of these flue gases.

In order to ensure this regulation, account must be taken, on the one hand, of variations of oxygen content in the flue gases at the outlet of the combustion chamber 4, and on the other hand of more or less rapid variations of the flow rate of unburnt gases at the outlet of the furnace 2.

Taking into account the oxygen content at the outlet of the combustion chamber leads to the determination of a first flow rate setting $C_1$ for the fan 9.

Taking into account the flow rate of the unburnt gases at the outlet of the furnace leads to the determination of a flow rate setting $C_2$ for the fan 9.

By adding $C_1$ and $C_2$, a setting $C_3$ is obtained, which is sent to the flow rate regulation device of the fan.

In order to determine the flow rate setting $C_1$, by means of a zirconia-cell oxygen analyzer 10 having a response time of less than 10 s and placed in the discharge duct 5, the oxygen content $M_1$ of the flue gases at the outlet of the combustion chamber 4 is measured; $M_1$ is expressed in %. By means of an electronic proportional, integral, differential (PID) regulation device 16, $M_1$ is compared to a setting $C_0$ of oxygen content desired in the flue gases and $C_1$ sent to a summing integrator 15 is worked out.

In order to work out the flow rate setting $C_2$, several embodiments are possible.

In a first embodiment (FIG. 1) by virtue of a pressure measurement means 17, the pressure difference $M_5$ which prevails between the inside and the outside of the enclosure of the furnace 2 is measured.

By means of an electronic device 14, the derivative with respect to time $$\frac{dM_5}{dt}$$

of $M_5$ is calculated and this derivative is compared to a threshold s. If $$\frac{dM_5}{dt} < s,$$

$C_2$ is set to 0, if $$\frac{dM_5}{dt} > s,$$

$C_2$ is set to a value such as: $C_2 = k \times M_5$. Indeed, when the production of unburnt gases in the furnace increases, the pressure inside the furnace increases and the flow rate of the unburnt gases at the outlet of the furnace is approximately proportional to the pressure difference between the outside and the inside of the furnace. The derivative calculation makes it possible to detect a rapid variation of this pressure difference associated with a sudden variation of gas production.

The setting $C_2$ is sent to a summing integrator 15 which works out the setting $C_3 = C_1 + C_2$ and which sends this setting to the flow rate regulation device of the fan 9.

Figure 2:
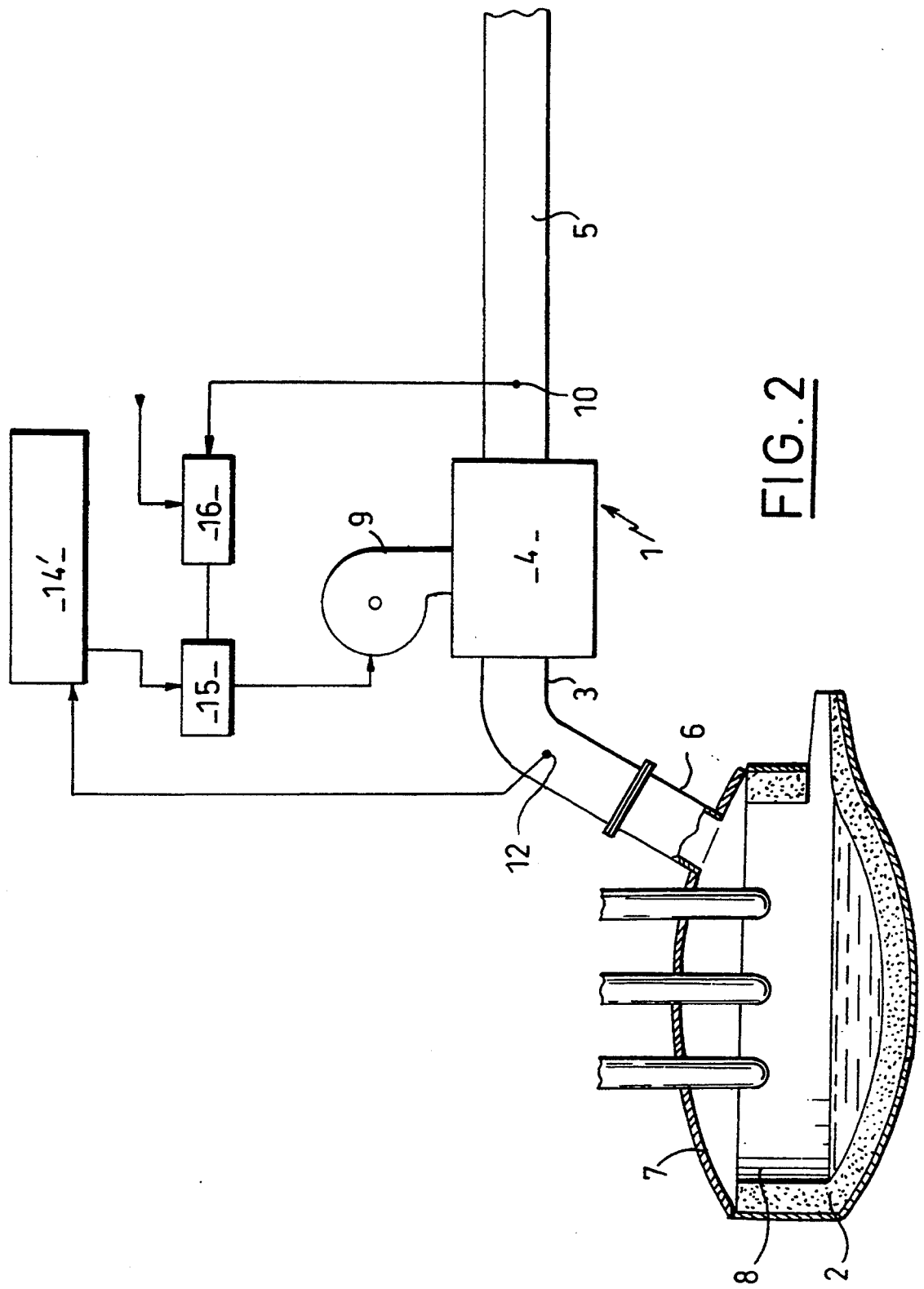
FIG. 2 represents a diagram of a device for collecting the gases and flue gases of an electric furnace fitted with a regulation device according to a second embodiment of the invention.

In a second embodiment (FIG. 2), the setting $C_2$ is worked out from a measurement $M_2$ of the carbon monoxide content of the flue gases at the outlet of the electric arc furnace 2; $M_2$ is expressed in %.

$M_2$ is measured by means of a carbon monoxide infrared radiation absorption analyzer having a response time of less than 10 s and placed in the collection duct 3, in the vicinity of the pipe 6. The measurement $M_2$ is sent to electronic means 14' which compare $M_2$ to thresholds $s_1, s_2, \ldots, s_n$ stepped between 0% and 100%. When $s_i < M_2 < s_{i+1}$, the electronic means 14' generates a square-wave signal of amplitude $a_i$ and of duration $t_i$; the sequence $a_1, a_2, \ldots, a_n$ is increasing, as is the sequence $t_1, t_2, \ldots, t_n$.

The different square waves generated are superimposed in order to work out the setting $C_2$ which is then sent to the summing integrator 15 where it is added to the setting $C_1$ coming from the electronic means 16 receiving the signal of the analyzer 10 in order to constitute the setting $C_3$ which is sent to the flow rate regulation device of the fan 9.

Figure 3:
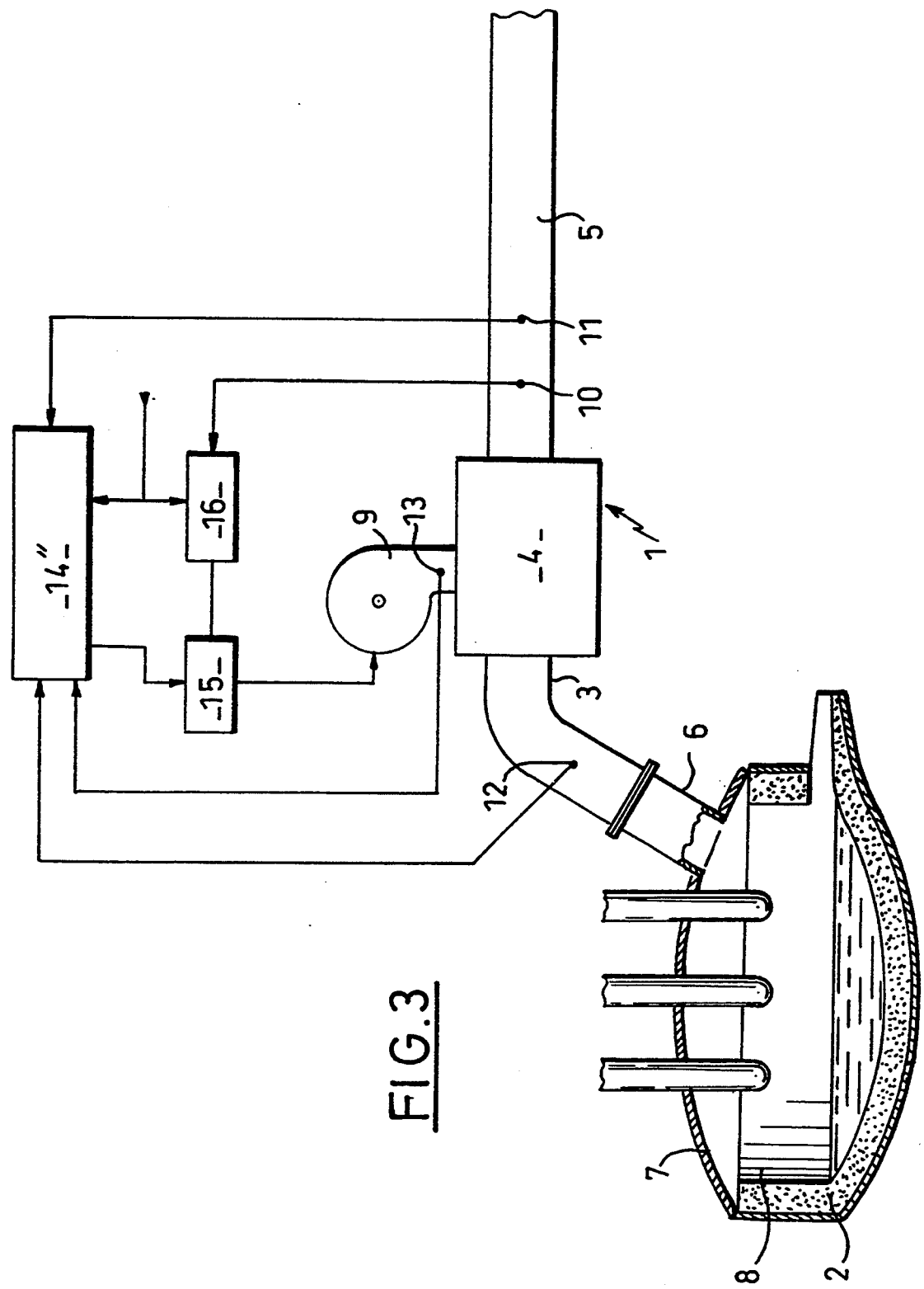
FIG. 3 represents a diagram of a device for collecting the gases and flue gases of an electric furnace fitted with a regulation device according to a third embodiment of the invention.

In a third embodiment (FIG. 3), the setting $C_2$ is worked out by means of:

the measurement $M_1$ of the oxygen content of the flue gases at the outlet of the combustion chamber 4 (analyzer 10)

the measurement $M_2$ of the content of unburnt gases at the outlet of the furnace (analyzer 12)

a flow rate measurement $M_3$ of the combustion air sent to the combustion chamber and carried out by means of Pitot tube probes 13 placed at the outlet of the fan 9, a flow rate measurement $M_4$ of the flue gases in the discharge duct 5 carried out by means of a Pitot tube probe 11 placed in the duct 5.

By means of an electronic calculator 14″, $C_2$ is calculated from $M_1$, $M_2$, $M_3$, $M_4$ and $C_0$. This setting $C_2$ is sent to the summing integrator 15 which adds it to the setting $C_1$ and provides a setting $C_3 = C_1 + C_2$ sent to the flow rate regulation device of the fan 9.

In order to determine $C_2$, the following are calculated:

the flow rate $q_f$ of the flue gases at the outlet of the furnace:

$$q_f = \left(1 - \frac{C_0}{100}\right) \times M_4 - 0.8 \times M_3 \ (C_0 \text{ expressed in \%}).$$

This formula is approximate because $C_0$ is used as oxygen content; it may be replaced by a more accurate formula $$q_f = \left(1 - \frac{M_1}{100}\right) \times M_4 - 0.8 \times M_3$$

the flow rate $q_{o2}$ of oxygen necessary for burning all the carbon monoxide and for having an oxygen content of the flue gases equal to $C_0$:

$$q_{02} = \left( \alpha q_f \times \frac{M_2}{100} + \frac{C_0}{100} M_4 \right) (M_2 \text{ in } \%)$$

$\alpha$ is a stoichiometric coefficient which depends on the nature of the gas to be burned. In the case of carbon monoxide $\alpha = 0.5$.

The flow rate setting $C_2$ for the ventilator is derived therefrom, taking into account the proportion of oxygen in air:

$$C_2 = \frac{q_{02}}{0.2}$$

The operation is as follows:

in the quasi steady-state regime of flue gas emission by the furnace, the measurements of carbon monoxide content and of flue gas flow rate do not show significant variations; if the oxygen content measurement shows a difference with respect to the setting, the regulator sends to the fan a flow rate setting which tends to return the oxygen content to the set value;

in transient regime, for example during a sudden and considerable emission of carbon monoxide, the calculation made from the measurements of carbon monoxide content, of flue gas flow rate and of combustion air flow rate, generates an increase of the combustion air flow rate setting which is taken into account by the regulation device of the fan before the combustion chamber is saturated in carbon monoxide; if the combustion air is in excess, the oxygen content measurement sent to the regulation device 16 generates a correction setting which tends to adjust the combustion air flow rate to the value just necessary.

Thus, this regulation method makes it possible to control the oxygen content in the flue gases at the outlet of the combustion chamber even for rapid transient regimes. This makes it possible to ensure that all the carbon monoxide is burnt.

It will be noted that this process can be applied to any reactor producing flue gases containing a combustible gas which is intended to be burned and the combustion of which is to be controlled, this is in particular the case with metallurgical reactors.

It will also be noted that the combustion air can be supplied by a fan or any other device and that the air flow rate regulation of the fan can be made either by acting on the rotation speed of the fan or by using other means such as sliding valves.

The measurement means can also be other than those described. Any means of oxygen or carbon monoxide analysis and any flow rate measurement means can be used as long as they have a sufficiently short response time.

The incompletely burnt gas contained in the flue gases at the outlet of the furnace may be a gas other than carbon monoxide. This may be for example hydrogen or another gas capable of being subjected to a combustion.

Finally, the various measurements may be sent to a single electronic calculator which works out the setting $C_3$ directly and sends it to the regulation device of the combustion air supply device.

We claim:

1. A method of controlling the production of gas in an electric arc furnace comprising the steps of:
   producing in a main combustion chamber exhaust gasses;
   measuring the oxygen content of the exhaust gasses in a discharge duct of said main combustion chamber;
   measuring incompletely burnt gases including CO in said discharge duct;
   burning in a secondary combustion chamber the discharged gases from said main combustion chamber; and
   providing a flow of combustion air in said secondary combustion chamber based upon said measured oxygen content and said measured incompletely burnt gasses.

2. A method as in claim 1 further comprising the steps of:
   establishing a set value of CO in the exhaust gases;
   calculating a value indicative of said set value as compared to a measured value of CO.

3. A method as in claim 2 further comprising the steps of:
   detecting and measuring at said discharge duct of said main combustion chamber changes in a flow rate of said exhaust gasses discharged from said main combustion chamber;
   adjusting a flow rate of combustion air into said secondary combustion chamber based upon said detecting and measuring.

4. A method as in claims 1, 2 or 3 wherein each of said steps of measuring comprise the step of:
   comparing a pressure difference between the inside of the main combustion chamber and the outside thereof.

5. A method as in claim 2 further comprising the steps of:
   establishing a first variable equal to said set value;
   establishing a second variable indicative of variations in the flow rate, the change in CO discharging from said main combustion chamber;
   determining a derivative of said second variable in relation to time; and
   adjusting a flow based upon said first variable, said second variable and said derivative.

6. An apparatus for metallurgical reactions comprising:
   a main combustion chamber having an outlet for discharging of gasses;
   a monitoring device mounted in said outlet for monitoring the flow of gasses in said outlet and for determining an oxygen content and a CO content thereof;
   a secondary combustion chamber for burning said gasses discharging from said main combustion chamber;
   a variable supply of combustion gasses into said secondary chamber;
   a means for varying said supply of combustion gasses to said secondary chamber based upon the oxygen content and the CO content of gasses being provided from said main combustion chamber.

7. An apparatus as in claim 6 wherein said monitoring device comprises:
   pressure transducers.

8. An apparatus for controlling gasses that occur in metallurgical reactions in an electric arc furnace having a main combustion chamber and a secondary combustion chamber comprising:

a monitoring device mounted in an outlet from said main combustion chamber for monitoring a flow of gasses in said outlet and for determining an oxygen content and a CO content thereof;

a means to control a variable supply of combustion gasses into said secondary chamber;

a means for controlling said variable supply of combustion gasses to said secondary chamber based upon the oxygen content and the CO content of gasses being provided from the main combustion chamber.

* * * * *